(12) United States Patent
Rector et al.

(10) Patent No.: US 10,112,560 B2
(45) Date of Patent: Oct. 30, 2018

(54) DEVICES, SYSTEMS AND METHODS FOR CONTROLLING PERMITTED SETTINGS ON A VEHICLE

(71) Applicant: AT&T Mobility II LLC, Atlanta, GA (US)

(72) Inventors: Jay Daryl Rector, Loganville, GA (US); John Potts Davis, III, Marietta, GA (US); Justin Michael Anthony McNamara, Dunwoody, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 838 days.

(21) Appl. No.: 14/257,083

(22) Filed: Apr. 21, 2014

(65) Prior Publication Data

US 2014/0229035 A1 Aug. 14, 2014

Related U.S. Application Data

(63) Continuation of application No. 12/632,375, filed on Dec. 7, 2009, now Pat. No. 8,706,349.

(51) Int. Cl.
| | |
|---|---|
| *B60R 16/037* | (2006.01) |
| *H04M 1/725* | (2006.01) |
| *H04M 3/42* | (2006.01) |
| *H04W 28/18* | (2009.01) |
| *H04M 3/436* | (2006.01) |

(Continued)

(52) U.S. Cl.
CPC ....... *B60R 16/037* (2013.01); *H04M 1/72577* (2013.01); *H04M 3/42136* (2013.01); *H04W 28/18* (2013.01); *H04M 3/436* (2013.01); *H04M 2203/053* (2013.01); *H04M 2203/651* (2013.01);

(Continued)

(58) Field of Classification Search
CPC .................................................... B60R 16/037
See application file for complete search history.

(56) References Cited

U.S. PATENT DOCUMENTS

| | | |
|---|---|---|
| 6,959,282 B2 | 10/2005 | Kakihara et al. |
| 7,085,635 B2 | 8/2006 | Boman et al. |

(Continued)

OTHER PUBLICATIONS

U.S. Office Action dated Jul. 27, 2012 in U.S. Appl. No. 12/632,375.

(Continued)

*Primary Examiner* — Thomas G Black
*Assistant Examiner* — Ana D Thomas
(74) *Attorney, Agent, or Firm* — Hartman & Citrin LLC

(57) ABSTRACT

Devices, systems, and methods are disclosed for altering permitted settings of a vehicle according to a driver identified through short range wireless communication. The vehicle captures a unique identifier from a wireless communication device of the driver of the vehicle. This unique identifier is used to reference a database to determine the identity of the driver as well as settings for the driver created by a controlling authority. The controlling authority may be, for instance, a parent or employer of the driver. The settings may limit certain devices within the vehicle and/or the vehicle itself. Speed control settings, radio settings, wireless communication device settings, and various other settings are all possible to limit distractions to the driver. Further, the settings may be influenced by the number or identities of passengers within the vehicle.

20 Claims, 10 Drawing Sheets

(51) Int. Cl.
   *H04W 8/18*    (2009.01)
   *H04W 8/26*    (2009.01)
   *H04W 48/08*   (2009.01)

(52) U.S. Cl.
   CPC ............... *H04W 8/18* (2013.01); *H04W 8/26* (2013.01); *H04W 48/08* (2013.01)

(56) References Cited

U.S. PATENT DOCUMENTS

| | | | |
|---|---|---|---|
| 7,106,212 B2 | 9/2006 | Konishi et al. | |
| 7,304,564 B2 | 12/2007 | Yang et al. | |
| 7,489,993 B2 | 2/2009 | Coffee et al. | |
| 8,050,815 B2 | 11/2011 | Perry et al. | |
| 8,280,791 B2 | 10/2012 | Davis et al. | |
| 8,493,234 B2 | 7/2013 | McNamara et al. | |
| 2003/0058086 A1* | 3/2003 | Hara | B60R 25/245 340/425.5 |
| 2006/0168627 A1* | 7/2006 | Zeinstra | H04M 1/6091 725/75 |
| 2008/0085689 A1* | 4/2008 | Zellner | H04M 1/6075 455/187.1 |
| 2008/0098461 A1* | 4/2008 | Chiou | G06F 21/31 726/4 |
| 2008/0223646 A1 | 9/2008 | White et al. | |
| 2008/0228358 A1* | 9/2008 | Wang | B60R 21/01554 701/49 |
| 2008/0245598 A1 | 10/2008 | Gratz et al. | |
| 2009/0210141 A1 | 8/2009 | Young et al. | |
| 2010/0097178 A1* | 4/2010 | Pisz | B60R 16/037 340/5.72 |
| 2010/0222939 A1* | 9/2010 | Namburu | G07C 9/00111 701/2 |
| 2011/0105097 A1* | 5/2011 | Tadayon | H04W 4/50 455/418 |
| 2011/0137520 A1 | 6/2011 | Rector et al. | |
| 2011/0137773 A1* | 6/2011 | Davis, III | G01G 19/4142 705/34 |
| 2013/0300582 A1* | 11/2013 | McNamara | G08G 1/096716 340/905 |

OTHER PUBLICATIONS

U.S. Office Action dated Jun. 5, 2013 in U.S. Appl. No. 12/632,375.
U.S. Notice of Allowance dated Nov. 12, 2013 in U.S. Appl. No. 12/632,375.

* cited by examiner

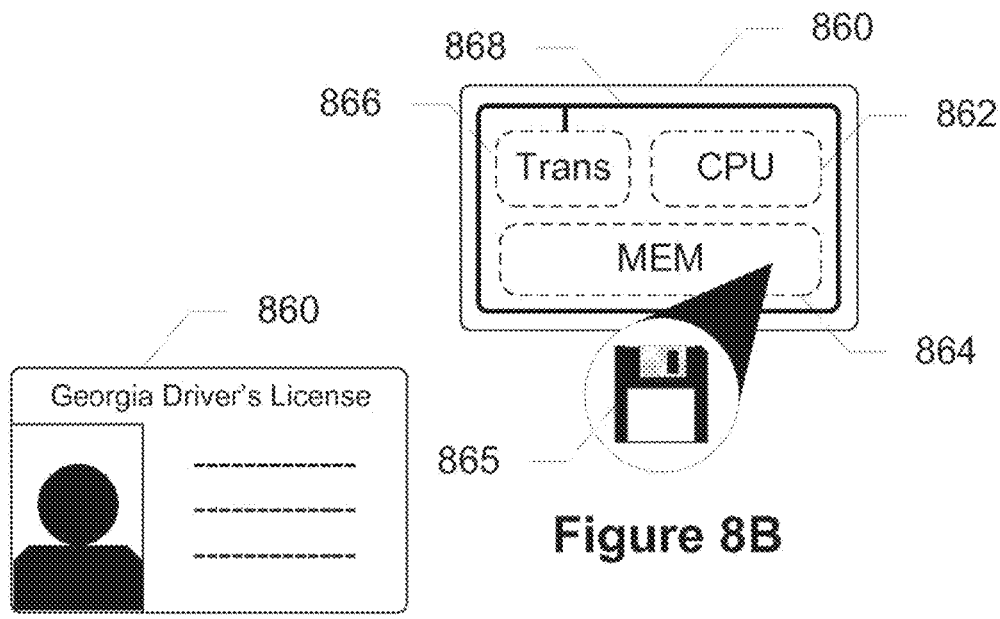
Figure 8A
Figure 8B
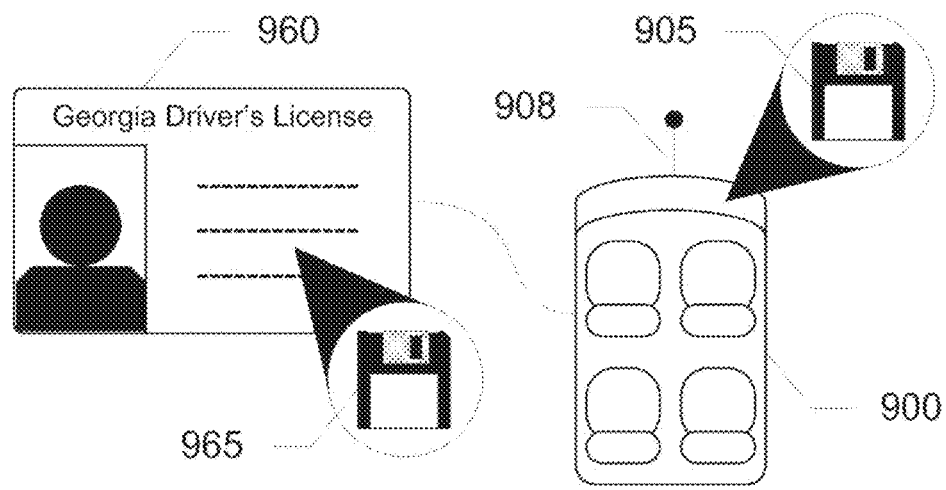
Figure 9

DEVICES, SYSTEMS AND METHODS FOR CONTROLLING PERMITTED SETTINGS ON A VEHICLE

CROSS-REFERENCE TO RELATED APPLICATION

This application is a continuation of and claims priority to U.S. patent application Ser. No. 12/632,375, filed Dec. 7, 2009, now U.S. Pat. No. 8,706,349, the entire contents of which is incorporated by reference herein.

BACKGROUND OF THE INVENTION

Field of the Invention

The present invention relates to vehicle driver identification. More specifically, the present invention relates to altering permitted settings of a vehicle based upon a driver.

Background of the Invention

Car crashes are the leading cause of death for teens in the United States, with accidents while driving causing 36% of all deaths in this age group. The risk of a crash is much higher during the first years a teenager is able to drive. Teenage drivers tend to underestimate hazardous driving situations and are less able than more experienced drivers to recognize dangerous situations.

Along with their lack of mature driving habits, teenagers often create many distractions while driving. Listening to loud music may prevent a teenager from noticing an emergency vehicle or oncoming car. Having teen male passengers in the car has been shown to increase the likelihood of high risk driving behaviors among teenage male drivers. Talking on the phone while driving is estimated to increase the risk of a crash fourfold. These extra distractions cause parents to worry, and, while very dangerous, may be very preventable.

Present-day technology can alleviate some of these distractions. Notably, microelectronic devices are becoming more and more ubiquitous. By coupling processors, memories, and transceivers to these devices, almost any handheld object can become a wireless communication device capable of transmitting and receiving data over a network. It is easy to set up a personal-area network with a few such devices incorporated into various everyday objects. However, this functionality is currently not being exploited to its full level.

What is needed is a means for identifying a driver of a vehicle in order to place restrictions or otherwise create settings for the driver.

SUMMARY OF THE INVENTION

The present invention addresses the above-identified issues by altering permitted settings of a vehicle according to a driver identified through short range wireless communication. In exemplary embodiments, a smart vehicle captures a unique identifier from a wireless communication device of the driver of the smart vehicle. This unique identifier is used to reference a database to determine the identity of the driver as well as settings for the driver created by a controlling authority. The controlling authority may be, for instance, a parent or employer of the driver. The settings may limit certain devices within the smart vehicle and/or the smart vehicle itself. Speed control settings, radio settings, wireless communication device settings, and various other settings are all possible to limit distractions to the driver. Further, the settings may be influenced by the number or identities of passengers within the smart vehicle.

In one exemplary embodiment, the present invention is a system for controlling a driver's settings, the system including a network; a smart vehicle in communication with the network; a wireless communication device in communication with the smart vehicle; a settings server on the network, the settings server including a user account for a user of the wireless communication device, the user account including permitted settings for the user; a client logic on the smart vehicle to retrieve a unique identifier from the wireless communication device and transmit the unique identifier to the settings server; and a server logic on the settings server to associate the unique identifier with the user account, determine the permitted settings for the user, and transmit the permitted settings to the client logic, wherein the client logic limits functions of the smart vehicle based upon the permitted settings.

In another exemplary embodiment, the present invention is a method for controlling a driver's settings, the method including requesting a unique identifier from a wireless communication device in communication with a smart vehicle; receiving the unique identifier from the wireless communication device and determining an identity of a driver in possession of the wireless communication device based upon the unique identifier; referencing settings corresponding to the identity of the driver; and implementing the settings, wherein the settings are chosen by a controlling authority and include one or more of permitted speed settings, permitted radio settings, and permitted use of the wireless communication device.

In yet another exemplary embodiment, the present invention is a smart vehicle, including a vehicle; a processor coupled to the vehicle; a memory in communication with the processor; a transceiver in communication with the processor; an antenna coupled to the transceiver; and a client logic on the memory to retrieve a unique identifier from a wireless communication device, determine an identity of a user of the wireless communication device based upon the unique identifier, determine permitted settings for the user, the permitted settings created by a controlling authority, and implement the permitted settings.

BRIEF DESCRIPTION OF THE DRAWINGS

FIGS. 8A and 8B show a contactless smart card embedded in a driver's license, according to an exemplary embodiment of the present invention.

FIG. 9 shows a smart vehicle detecting a driver's license, according to an exemplary embodiment of the present invention.

DETAILED DESCRIPTION OF THE INVENTION

Figure 1:
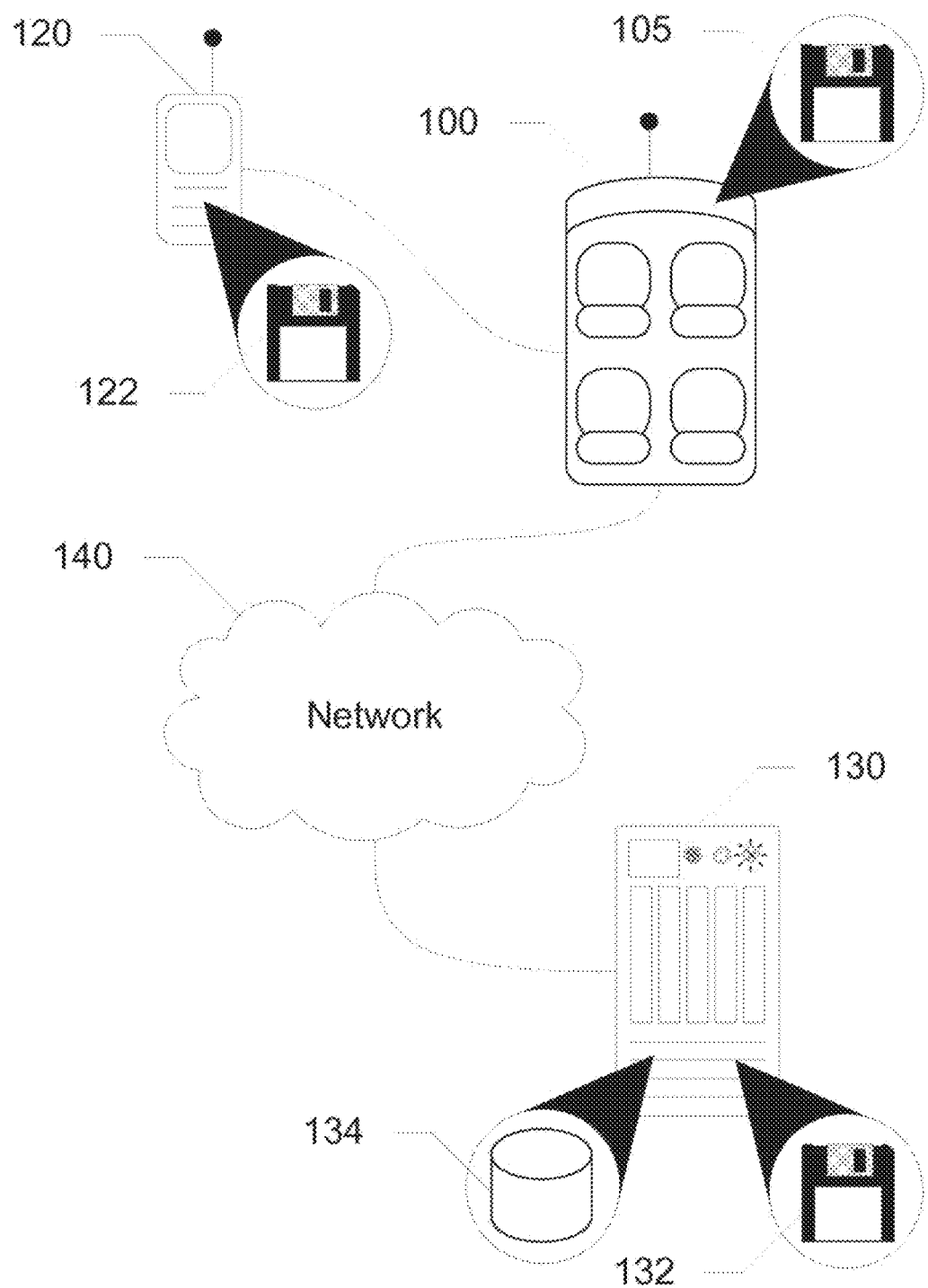
FIG. 1 shows a system for controlling a driver's settings, according to an exemplary embodiment of the present invention.

The following detailed description discloses devices, systems, and methods for identifying a driver within a vehicle using short range wireless communications in order to alter permitted settings of the vehicle. In exemplary embodiments a smart vehicle captures a unique identifier from a wireless communication device of the driver of the smart vehicle. This unique identifier is used to reference a database to determine the identity of the driver as well as settings for the driver created by a controlling authority. The controlling authority may be, for instance, a parent or employer of the driver. The settings may limit certain devices within the smart vehicle and/or the smart vehicle itself. Speed control settings, radio settings, wireless communication device settings, and various other settings are all possible to limit distractions to the driver. Further, the settings may be influenced by the number or identities of passengers within the vehicle.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. A wireless communication device also includes smart cards, such as contactless integrated circuit cards (CICC). The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Wireless communication devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include WIFI and BLUETOOTH® networks, with communication being enabled by hardware elements called "transceivers." A CICC, for instance, has an RFID transceiver. Wireless communication devices may have more than one transceiver, capable of communicating over different networks. For example, a cellular telephone can include a GPRS transceiver for communicating with a cellular base station, a WIFI transceiver for communicating with a WIFI network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. A settings server is an example of such a server. A settings server can include several network elements, including other servers, and is part of a network, for example, a cellular network. A settings server hosts or is in communication with a database hosting an account for a user of a wireless communication device. The "user account" includes several attributes for a particular user, including a unique identifier of the wireless communication device(s) owned by the user, relationships with other users, driver settings, and other information.

A "vehicle," as used herein and throughout this disclosure, includes cars, trucks, and buses, as well as aircrafts and watercrafts.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for controlling a driver's settings, according to an exemplary embodiment of the present invention. In this embodiment, the system includes a smart vehicle 100 with a client logic 105, a wireless communication device 120 with a wireless logic 122, a network 140, and a settings server 130 with a server logic 132 and a database 134. Smart vehicle 100 is in communication with wireless communication device 120 and with settings server 130 over network 140. Wireless communication device 120 is shown outside smart vehicle 100 for purposes of showing the flow of communication only. It is to be understood that wireless communication device 120 is used by the driver of smart vehicle 100. Wireless communication device 120 may be, for instance, a cellular telephone or a contactless smart card. Smart vehicle 100 transmits a request to wireless communication device 120, and wireless logic 122 responds with a unique identifier of wireless communication device 120. In the case of a cellular telephone, the unique identifier may be an MSISDN, IMSI, MAC address, etc. In the case of a contactless smart card, the unique identifier can be any alphanumeric, hexadecimal, or other unique string of characters. Client logic 105 on smart vehicle 100, via an antenna and transceiver, receives the unique identifier from wireless communication device 120 and determines the identity of the driver.

Client logic 105 transmits the unique identifier and location to settings server 130 via network 140. This transmission may occur via WIFI, GPRS, or other protocols capable of communicating such information across a wide-area network such as the Internet. Settings server 130 includes settings for the driver that is associated with the unique identifier transmitted from wireless communication device 120. The settings, at least in part, are set by a controlling authority, such as a parent or superior of the driver. The settings may be set by the controlling authority through a web browser, by text message, by a dedicated application on the authority's wireless communication device, etc. Server logic 132 matches the driver's identity with corresponding settings from database 134 on settings server 130. The settings may include driver created settings as well as controlling authority settings, such as parental controls, based upon the driver's identity. The driver created settings may include seat and mirror positions, programmed radio stations, temperature controls, etc. The controlling authority settings may include a maximum speed of smart vehicle 100, radio controls, wireless communication device controls, passenger based controls, etc.

The maximum allowed speed of smart vehicle 100 may be set by the controlling authority. For instance, a parent may not want his or her child to drive above seventy miles per hour. The parent uploads this setting to the settings server using a wireless communication device in communication with settings server 130 over network 140, using a personal computer in communication with the settings server 130 over network 140, etc. When smart vehicle 100 determines that the child is driving, smart vehicle 100 limits the maximum speed that smart vehicle 100 will travel. This may be accomplished, for example, by using a speed governor on smart vehicle 100. Even if the child attempts to exceed the maximum allowed speed, the speed governor will prevent this action.

Radio controls may also be set by the controlling authority. The controlling authority may set a maximum radio volume, allowed radio stations, prohibited radio stations, prohibited compact discs, etc. For example, certain satellite radio stations use language or play songs which a parent may not wish their child to listen to, especially while driving. The parent may prohibit these stations in the settings for the child. An employer may not want an employee to play loud music while driving the company car. The employer may set a maximum volume level for employees in the settings for each employee, for the smart vehicle, for certain times, etc.

Wireless communication device controls restrict the actions allowed by the driver's wireless communication device 120. For example, the driver's wireless communication device 120 may be prohibited from accepting calls or creating text messages while the key is in the ignition. Other features of the driver's wireless communication device 120 may also be limited. The restrictions may be executed via a "crippling" application installed on the driver's wireless communication device, by editing registry entries of an operating system of the driver's wireless communication device, by limiting services offered by the network during the course of driving the smart vehicle (such as disabling text messages), or by any equivalent means known in the art.

In embodiments of the present invention, the settings may further include the number of passengers in the smart vehicle or the identities of passengers. For instance, the radio control settings or speed control settings may be dependent upon the number of passengers or their identities. For example, when a young driver has a passenger, the settings may prevent the radio from being played and may set a maximum speed of the smart vehicle. When, however, the passenger is the young driver's parent, the smart vehicle can identify the parent, much like the identification of the driver, and remove or alter the settings.

Further settings may be based upon the time of day. The controlling authority may set a lower maximum permitted speed for certain hours, for instance, at night. The controlling authority may disable functions of the smart vehicle when the smart vehicle should not be in use. For example, a parent may limit the function of the smart vehicle during school hours so that his or her child is not tempted to skip class and drive off of school grounds.

In embodiments of the present invention, a notification may be sent to the controlling authority should the driver attempt to bypass or override the settings. This notification may be in the form of a text message, e-mail, etc. and may be automatically sent by the smart vehicle or settings server. For example, a text message may be sent to a wireless communication device of the controlling authority from the smart vehicle if the driver attempts to exceed the maximum permitted speed.

In further embodiments of the present invention, the settings may be stored on the driver's wireless communication device or on the memory of the smart vehicle. In these embodiments, the settings may be uploaded from the settings server to the driver's wireless communication device or the smart vehicle's memory. Alternatively, the settings may be directly set or uploaded by a second wireless communication device, such as that of a parent of the driver. In this alternative embodiment, the settings server may not be necessary to the system. The driver's wireless communications device would communicate with client logic of the smart vehicle and create settings which are stored on the memory of the wireless communications device or the smart vehicle. Various other settings are possible and would be apparent to one of ordinary skill in the art in light of this disclosure.

Figure 2:
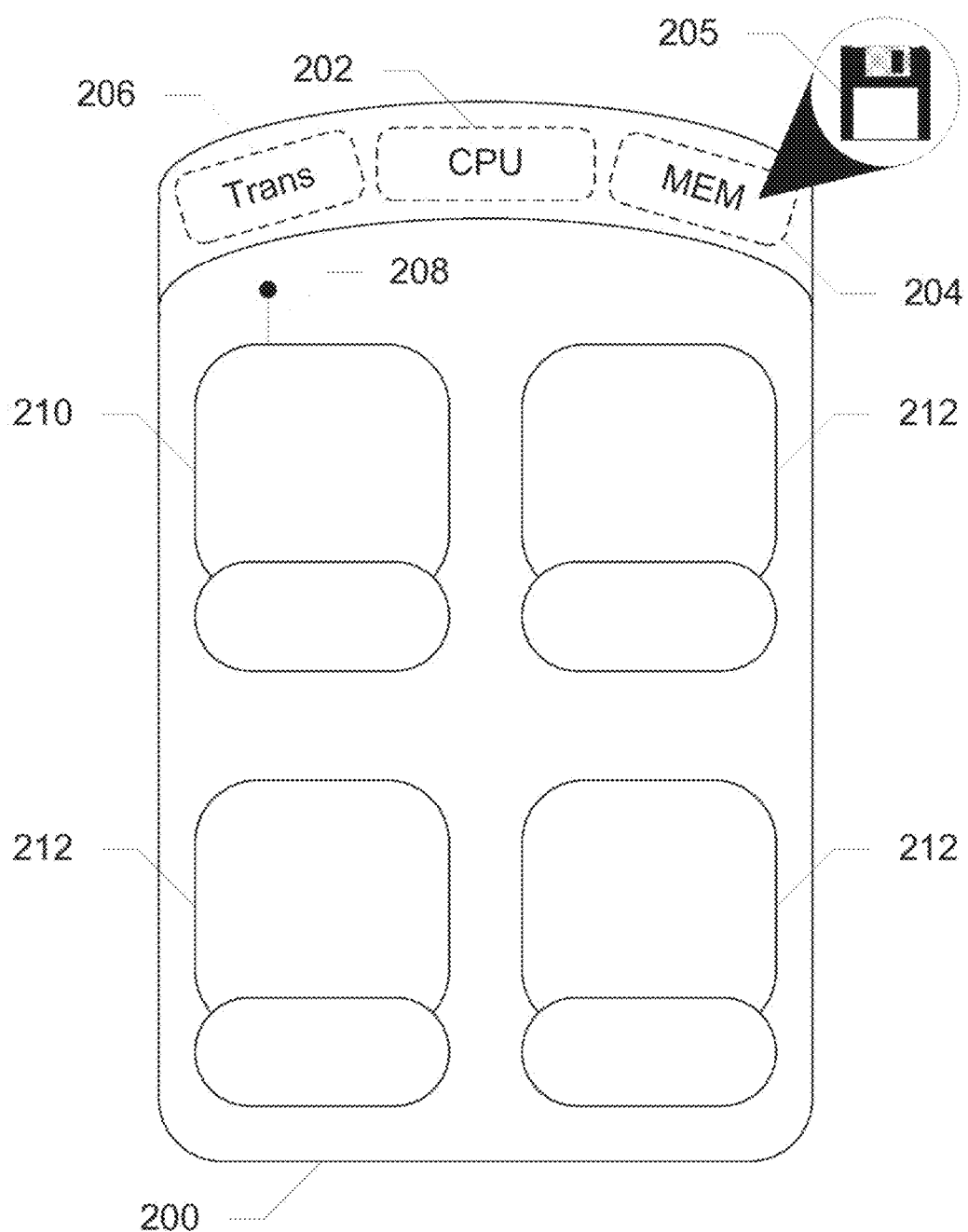
FIG. 2 shows a smart vehicle, according to an exemplary embodiment of the present invention.

FIG. 2 shows a smart vehicle 200, according to an exemplary embodiment of the present invention. In this embodiment, smart vehicle 200 is a vehicle which includes a central processing unit (CPU) 202, a memory 204 storing client logic 205, a transceiver 206, an antenna 208, a driver seat 210, and passenger seats 212. The vehicle can be any car, truck, boat, or aircraft. CPU 202 commands components of smart vehicle 200 according to client logic 205 on memory 204. Transceiver 206 allows smart vehicle 200 to wirelessly communicate with other devices on a network, for instance a personal area network within smart vehicle 200, a server on a network, other wireless devices, and so on. This communication may be through cellular radio frequency (RF) signals, WIFI, BLUETOOTH, infrared (IR), ZIGBEE®, etc. Antenna 208 is a transducer designed to transmit or receive electromagnetic waves.

The determination of a driver's identification and the subsequent initiation of the corresponding settings for the driver are performed by smart vehicle 200, in this exemplary embodiment, as follows. Transceiver 206, via antenna 208, detects the presence of wireless communication devices located within smart vehicle 200. At least the driver of smart vehicle 200 carries with them a wireless communication device such as a cellular telephone or a contactless smart card. The driver's wireless communication device is able to transmit a unique identifier corresponding to a user account for the driver. In the case of a cellular telephone, the unique identifier may be an MSISDN, IMSI, MAC address, etc. In the case of a contactless smart card, the unique identifier can be any alphanumeric, hexadecimal, or other unique string of characters. Using short range wireless communications, such as near-field communication or BLUETOOTH, antenna 208 transmits a request for the unique identifier from the driver's wireless communication devices within range of antenna 208. The driver's wireless communication device responds with the unique identifier. Client logic 205 retrieves the unique identifier from the driver's wireless communication device and associates the identifier with a plurality of driver settings. These driver settings may be contained on memory 204, may be contained on an external server, may be contained on the driver's wireless communication device, etc.

In many instances, more than one wireless communication device may be located within smart vehicle 200. The determination of a driver versus a passenger may be determined via a proximity measurement derived from signal strength, delay, or other measurements from antenna 208. For instance, antenna 208 may be located closer to driver seat 210 than passenger seats 212 such that the driver's wireless communication device has the strongest communication link to antenna 208, along with the shortest delay. Therefore, a driver is easily determined by placing antenna 208 significantly closer to the driver than any passenger. This ensures that antenna 208 perceives a measurable difference between signals from the driver and signals from a passenger.

As previously stated, the settings may further include the number of passengers in the smart vehicle or the identities of passengers. For instance, the radio control settings or speed control settings may be dependent upon the number of passengers or their identities. Thus, if antenna 208 detects wireless communication devices of the passengers, client logic 205 references the settings for the determined number of passengers.

Figure 3:
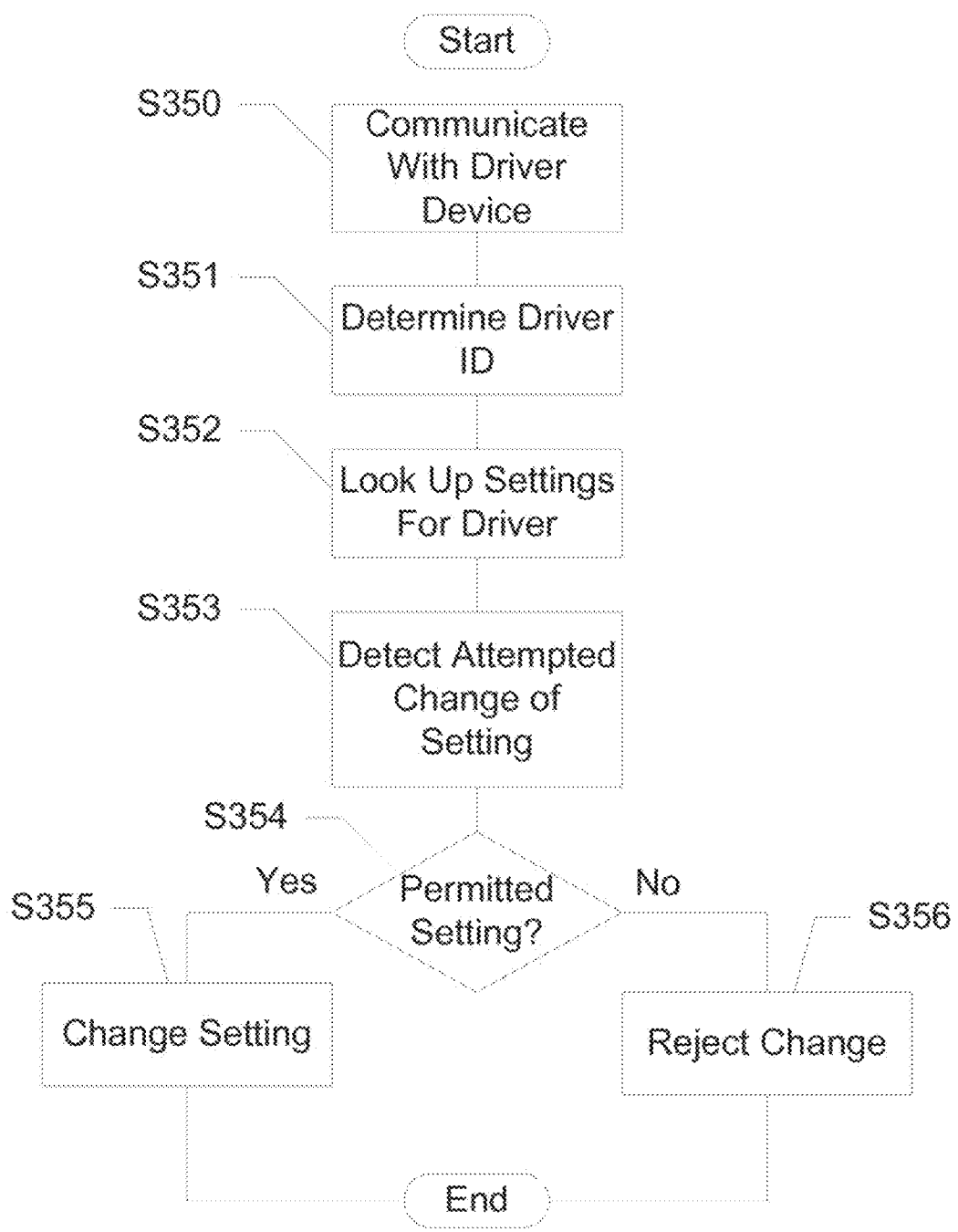
FIG. 3 shows a method of controlling a driver's settings on a smart vehicle, according to an exemplary embodiment of the present invention.

FIG. 3 shows a method of controlling a driver's settings on a smart vehicle, according to an exemplary embodiment of the present invention. In this embodiment, the method begins with the smart vehicle communicating with a driver's device S350. This device may be a wireless communications device, such as a cellular telephone, a contactless smart card, etc. The communication may occur as the driver enters the smart vehicle, as the driver starts the smart vehicle, etc. The smart vehicle communicates with the wireless communication device using short range wireless communication to request a unique identifier for the driver's wireless communication device. This short range wireless communication may be a personal area network, WIFI, BLUETOOTH, NFC, ZIGBEE, etc. In the case of a cellular telephone, the unique identifier may be an MSISDN, IMSI, MAC address, etc. In the case of a contactless smart card, the unique identifier can be any alphanumeric, hexadecimal, or other unique string of characters. The unique identifier is associated with a user of the smart vehicle. With the unique identifier, the smart vehicle determines the identity of the driver S351. A client logic and processor on the smart vehicle compares the unique identifier with a set of unique identifiers stored on a memory of the smart vehicle. Alternatively, the unique identifier may be compared with a set of unique identifiers on a server on a network. With the identity of the driver determined, the smart vehicle looks up settings for the driver S352. These settings may include driver created settings, controlling authority settings, etc. The settings are determined by comparing the driver's identity with a database of identities with corresponding settings. This database may be on the network, on the driver's device, on the smart vehicle's memory, etc. With the settings determined for the driver, the smart vehicle detects an attempted change of a setting S353. This may be the driver speeding up, the radio volume changing, the radio station changing, the driver's wireless communication device receiving an incoming call or text, etc. The smart vehicle determines whether the attempted change of the setting is permitted S354. This is accomplished by the client logic of the smart vehicle comparing the detected attempted change with the database of permitted or prohibited settings for the driver. If the change in setting is permitted, the change is allowed S355. For instance, the radio volume increases, the radio station changes, the call is received, the smart vehicle accelerates, etc. If the attempted setting is not permitted, the setting is rejected S356. For instance, the radio volume cannot be raised above the permitted setting, the radio station does not change, the call is not received, the smart vehicle does not accelerate above the maximum permitted speed, etc.

Figure 4:
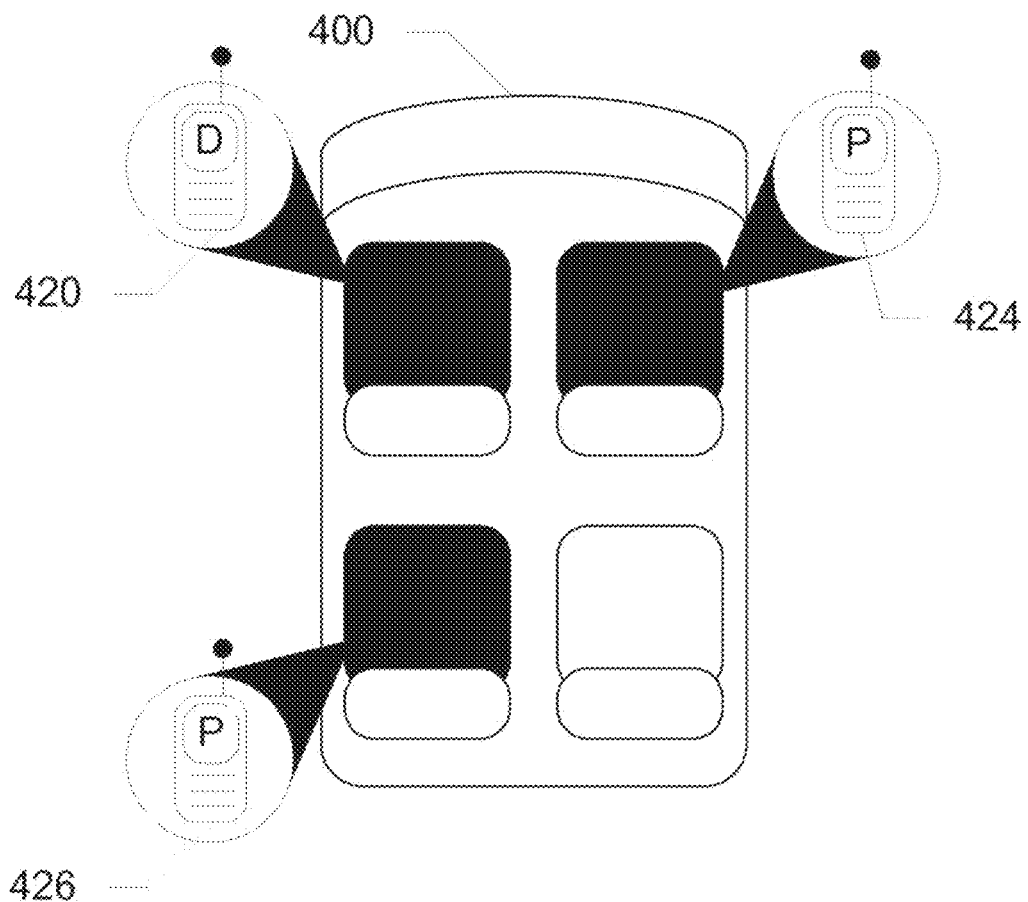
FIG. 4 shows a smart vehicle with multiple occupants, each with a wireless communications device, according to an exemplary embodiment of the present invention.

FIG. 4 shows a smart vehicle 400 with multiple occupants, each with a wireless communications device, according to an exemplary embodiment of the present invention. In this embodiment, smart vehicle 400 is carrying three occupants: a driver, and two passengers. The driver is a user of driver's wireless communication device 420, a front seat passenger is a user of wireless communication device 424, and a backseat passenger is a user of wireless communication device 426.

An antenna and transceiver in smart vehicle 400 are used by client logic to determine the number of passengers, based upon the number of wireless communication devices located within smart vehicle 400. For instance, wireless communication devices 420, 424, and 426 are detected and smart vehicle 400 determines there is a driver and two passengers. Smart vehicle 400 identifies the driver using the methods described herein, i.e. by capturing a unique identifier from driver's wireless communication device 420. With multiple devices, smart vehicle 400 determines wireless communication device 420 belongs to the driver, as wireless communications device 420 is closest to the antenna located near the driver's seat. Smart vehicle 400 references the settings for the driver from a memory on smart vehicle 400, a database on a network, a memory of wireless communication device 420, etc. For instance, a parent may place restrictions on his or her child based upon the number of passengers in the vehicle, as higher numbers of passengers tend to distract the driver. With the two passengers in the car, the child may not be able to listen to the radio, or only listen at a low volume, as the radio may add another distraction. The speed of smart vehicle 400 may be limited in order to prevent the child from trying to drive fast, such as to "impress friends", etc.

Other restrictions may be placed upon the driver based upon the identity of a passenger. The identity of a passenger may be determined similarly to that of the driver, by requesting and receiving a device identifier. The identity of the passenger may place further restrictions on the driver. For instance, if the passenger is the driver's younger sibling, restrictions may be put in place to protect the younger sibling. This may include limiting the maximum speed, blocking certain radio stations, etc. If the passenger is a friend, different restrictions may be placed on the driver. These restrictions may be in place to limit distractions. If the passenger is a parent of the driver, restrictions may be taken away. For instance, restrictions that may usually occur with two passengers may not take effect if the parent is in the car, as determined by the device identifier of the parent's device.

As families often share devices, such as cellular phones, biometrics may also be utilized to determine the driver, passenger, etc.

The present invention also allows for several secondary means of driver identification. One can conceive of situations where an occupant of a smart vehicle is not instantly detectable. For instance, a wireless communication device may be switched off or a battery dies. The wireless communication device may be placed in a purse or bag and put in the back seat, or another part of the smart vehicle, or held by a passenger. The device may be shared by multiple users. This can result in mistaken driver identification. Therefore, embodiments of the smart vehicle include a plurality of secondary identification means, including biometrics and weight sensors. These backup means for driver and passenger identification introduce a redundancy to the present invention, allowing the settings control system to verify that the correct party is determined to be the driver and appropriate settings are enforced.

Figure 5:
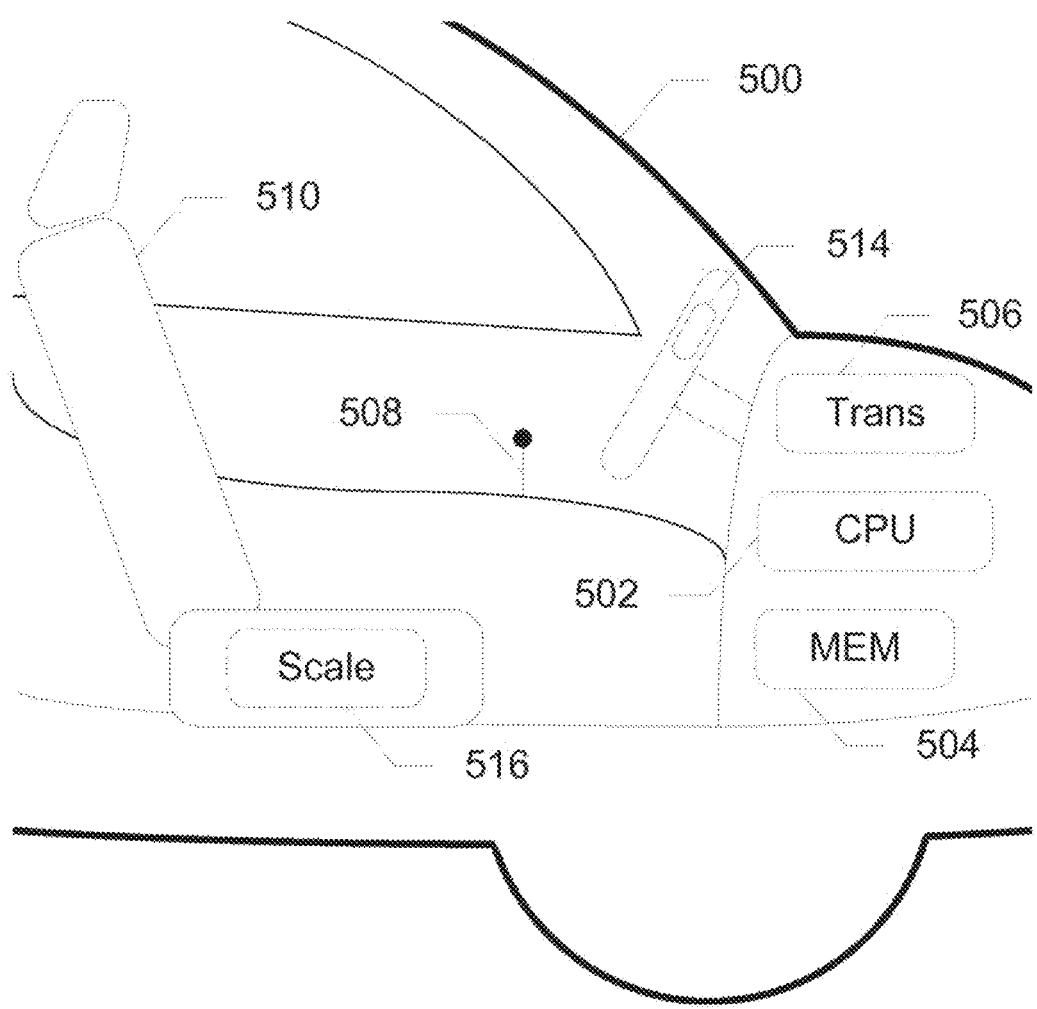
FIG. 5 shows secondary means for verifying a driver's identity, according to an exemplary embodiment of the present invention.

FIG. 5 shows secondary means for verifying a driver's identity, according to an exemplary embodiment of the present invention. Smart vehicle 500 comes equipped with a CPU 502, a memory 504, a transceiver 506, an antenna 508, and a driver seat 510. As described above, CPU 502, based on logic stored on memory 504, controls transceiver 506 to detect the presence of and unique identifiers from any wireless communication devices located within smart vehicle 500. A driver's wireless communication device is identified by its relative proximity to antenna 508, which is positioned significantly closer to driver seat 510 than any other seat in smart vehicle 500.

However, in the case that an identity of a driver cannot be ascertained, smart vehicle 500 includes a plurality of secondary sensors. These include a biometric identifier 514, for instance, a fingerprint scanner placed on the steering wheel. A database of drivers' fingerprints is stored on memory 504 or externally on a network, and the detected fingerprint is associated with a driver's identity. Although this can be used for security purposes (such as starting the smart vehicle, reporting a stolen vehicle, etc.) or for convenience purposes (such as adjusting the seat back/position/mirrors based on the identified driver), the present invention uses this biometric identifier to associate the driver with a user account associated with the driver. Thus, if the driver's wireless communication device is switched off or undetectable, the driver can still be determined and the appropriate settings put in place.

Smart vehicle 500 further includes a weight scale 516 coupled to driver seat 510. Weight scale 516 determines a weight of a driver. Weight scale 516 can include a strain gauge, piezoelectric sensor, etc. The measured weight serves several purposes including identifying whether or not a driver is present in smart vehicle 500. Using this, a false driver identification is avoided even if a passenger's wireless communication device is detected to be in proximity of antenna 508. Further, a particular weight or range of weights can be programmed to correspond to specified driver profiles, such that smart vehicle 500 is aware which driver is driving smart vehicle 500, and thereby transmits the appropriate driver's identity to the settings server or the client logic on memory 504 for determining appropriate settings. Combinations of these secondary sensors are possible, and will be apparent to one skilled in the art in light of this disclosure.

Figure 6:
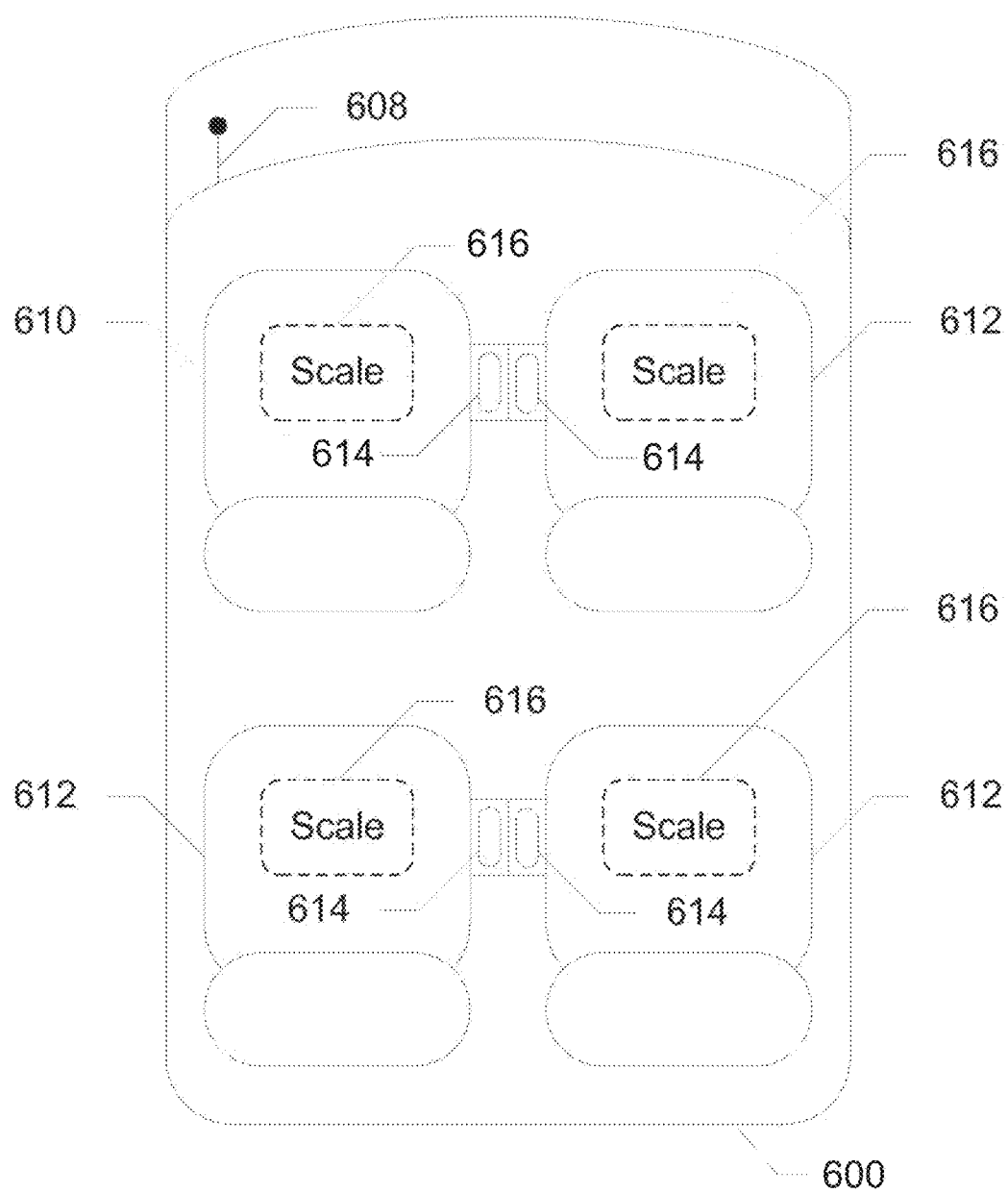
FIG. 6 shows a smart vehicle including biometric sensors, according to an exemplary embodiment of the present invention.

The concept of backup identification can also be applied to the passengers in the smart vehicle. FIG. 6 shows a smart vehicle 600 including biometric sensors, according to an exemplary embodiment of the present invention. In this embodiment, smart vehicle 600 includes an antenna 608, positioned near a driver's seat 610 of smart vehicle 600. Each seat is equipped with a biometric sensor, such as fingerprint readers 614, and weight scales 616. Biometric sensors are in communication with a processor and memory (not shown) for determining the driver and implementing settings based upon the driver and passengers.

Secondary sensors 614 and 616 serve to verify an identity of a driver and passengers as described above. Furthermore, weight scales 616 can help smart vehicle 600 to determine a number of passengers regardless of whether or not the passengers have wireless communication devices. Therefore, the number of passengers can be counted even if no unique identifiers are received by antenna 608. Furthermore, fingerprint readers 614 provide a verification of the identity of passengers, so as to avoid errors in case a wireless communication device belonging to a driver or a passenger is moved around smart vehicle 600. In some exemplary embodiments weight scales 616 are used merely to determine passenger presence and not necessarily passenger identity.

Figure 7A:
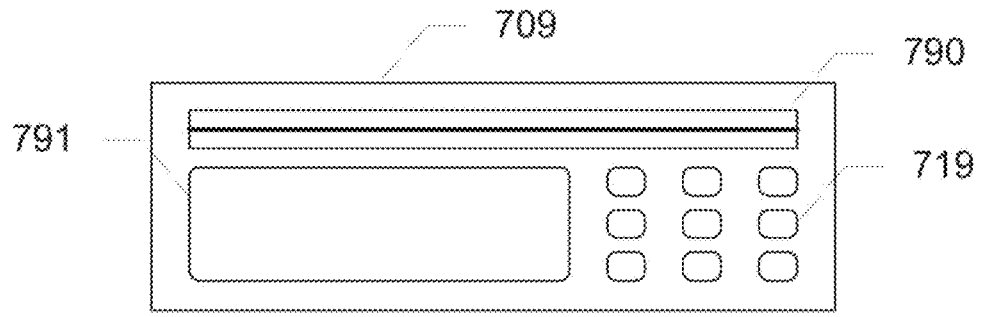
FIGS. 7A and 7B show an aftermarket smart vehicle upgrade, according to an exemplary embodiment of the present invention.
Figure 7B:
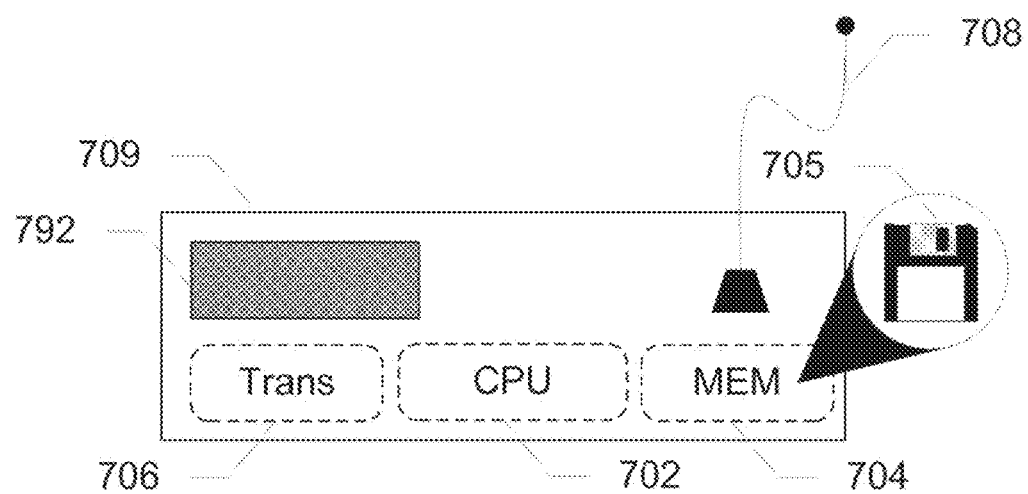

The above embodiment disclosed a smart vehicle having an in-dash transceiver, processor, and memory to control settings of the smart vehicle. However, the present invention allows for the entire functionality of the smart vehicle to be incorporated into a single aftermarket unit that can be used to upgrade any basic vehicle into a smart vehicle. FIGS. 7A and 7B show such an aftermarket smart vehicle upgrade 709, according to an exemplary embodiment of the present invention. Upgrade 709 mimics the form factor of traditional in-dash head units such as CD players or car audio receivers, and includes a display 791, a control panel 719, and can also include a disc-reader 790. Display 791 is any LCD or equivalent display, control panel 719 includes buttons, sliders, etc., and disc reader 790 can play audio and data discs such as CDs, DVDs, etc. The inner components of upgrade 709 include a CPU 702, a memory 704 having client logic 705 stored therein, a transceiver 706, an antenna 708, and a wire harness 792. The functions of CPU 702, memory 704, transceiver 706, and antenna 708 in the aftermarket unit are substantially similar to the functions of the equivalent components of the smart vehicle, which have been amply described above. Note that the placement of antenna 708 is flexible, thereby allowing a user to configure the upgrade to conform to a particular vehicle. Antenna 708 has a long wire connecting it to upgrade 709 allowing antenna 708 to be placed near the driver's seat inside vehicle.

Wire harness 792 provides an interface to other components of a vehicle. In traditional in-dash head units, wire harnesses 792 provide an interface to the speakers, amplifiers, fuse boxes, and other electrical systems of a vehicle. In this embodiment, wire harness 792 can further provide an interface to various sensors within the vehicle, such as speedometers, external transceivers, biometric/weight sensors embedded in the seats, etc. Therefore a controlling authority who installs upgrade 709 in their vehicle can program settings directly into upgrade 709 via display 791 and control panel 719. Further, disc reader 790 can be used to program new settings, load databases of settings for different drivers, and other information.

A wireless communication device includes many devices having a processor, memory, and transceiver. A contactless smart card includes all of the above, and in some embodiments, can be integrated into any object that a driver or passenger carries around all the time. Thus, no extra effort is needed to ensure that the wireless communication device is on the user's person at all times. For instance, a contactless smart card can be embedded in a user's driver's license. Since the driver is required by law to carry positive identification at all times while driving, a smart vehicle equipped with a contactless smart card reader will always be able to determine the driver's identity, and therefore implement settings for the driver based on his or her identity.

FIGS. 8A and 8B show a contactless smart card embedded in a driver's license 860, according to an exemplary embodiment of the present invention. Driver's license 860 includes embedded within it a CPU 862, a memory 864 having wireless logic 865 stored therein, a transceiver 866 and an antenna 868. CPU 862 controls the sending and receiving of signals via transceiver 866 based on wireless logic 865 stored on memory 864. Antenna 868 receives RF signals from the smart vehicle and transmits them to transceiver 866. Antenna 868 further acts as an inductor to capture the RF signal from the smart vehicle, rectify it, and thereby power the other components. In an alternative embodiment, the contactless smart card includes a power supply, thereby allowing driver's license 860 to communicate across greater distances. Memory 864 additionally stores a unique identifier for the driver. Upon receiving an RF query from the smart vehicle, logic 865 retrieves the stored unique identifier and transmits it to the smart vehicle via transceiver 866.

FIG. 9 shows a smart vehicle 900 detecting a driver's license 960, according to an exemplary embodiment of the present invention. Driver's license 960, including wireless logic 965, is in communication with an antenna 908 of smart vehicle 900. Client logic 905 onboard smart vehicle 900 enables antenna 908 to transmit an RF query within smart vehicle 900. The RF query is sensed by an antenna of driver's license 960. Wireless logic 965, in response, transmits a unique identifier corresponding to the driver's identity back to client logic 905. As described in the embodiments above, client logic 905 determines that the unique identifier corresponds to a driver's identity, depending on the placement of antennas 908, and the strength and/or latency of the received signal. Upon a determination of the driver's identity, this information can be transmitted to a settings server to implement settings for the driver.

Figure 10:
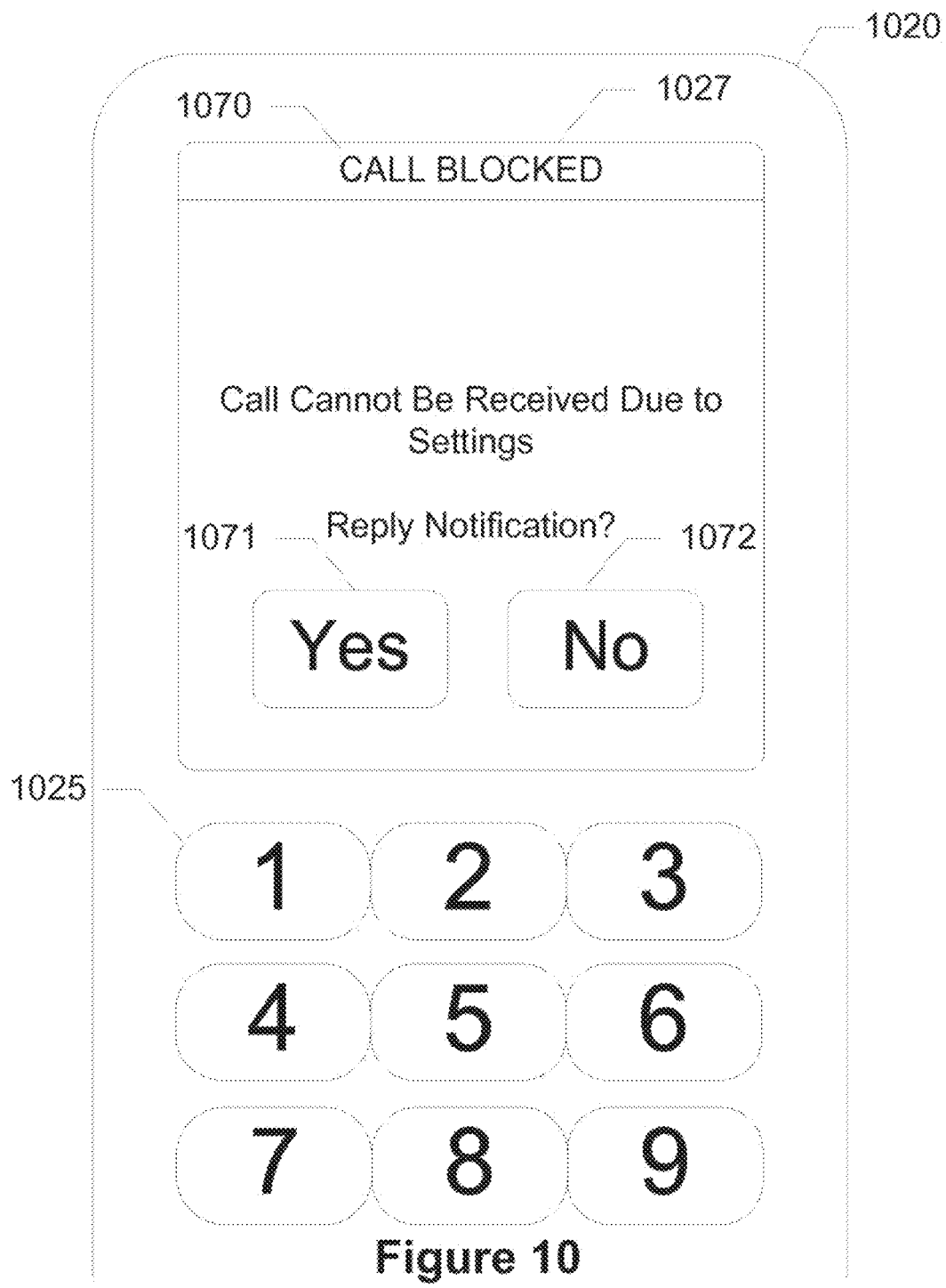
FIG. 10 shows a call block notification transmitted to a wireless communication device, according to an exemplary embodiment of the present invention.

FIG. 10 shows a call block notification 1070 transmitted to a wireless communication device 1020, according to an exemplary embodiment of the present invention. In this embodiment, wireless communication device 1020 belongs to the driver of a smart vehicle who has restrictions placed upon them while driving such that the driver cannot receive telephone calls. Call block notification 1070 notifies the driver that a call is incoming, but cannot be received. Wireless communication device 1020 includes a screen 1027 and a keypad 1025. Screen 1027 displays call block notification 1070, notifying the driver that the driver cannot receive calls while driving. The driver may, however, be given the option to automatically reply to the incoming call to notify the caller that the driver cannot take the call. To accomplish this, call block notification 1070 includes a "Yes" button 1071 and a "No" button 1072. Selecting "Yes" button 1071 confirms that the driver wishes to reply to the caller. Selecting "No" button 1072 confirms that the driver does not wish to reply to the caller. Keypad 1025 allows the driver to input an acceptance or denial of the reply, but may be locked to prevent the driver from being otherwise distracted. A similar notification can be sent to wireless communication device 1020 in the event of an incoming text, etc.

Figure 11:
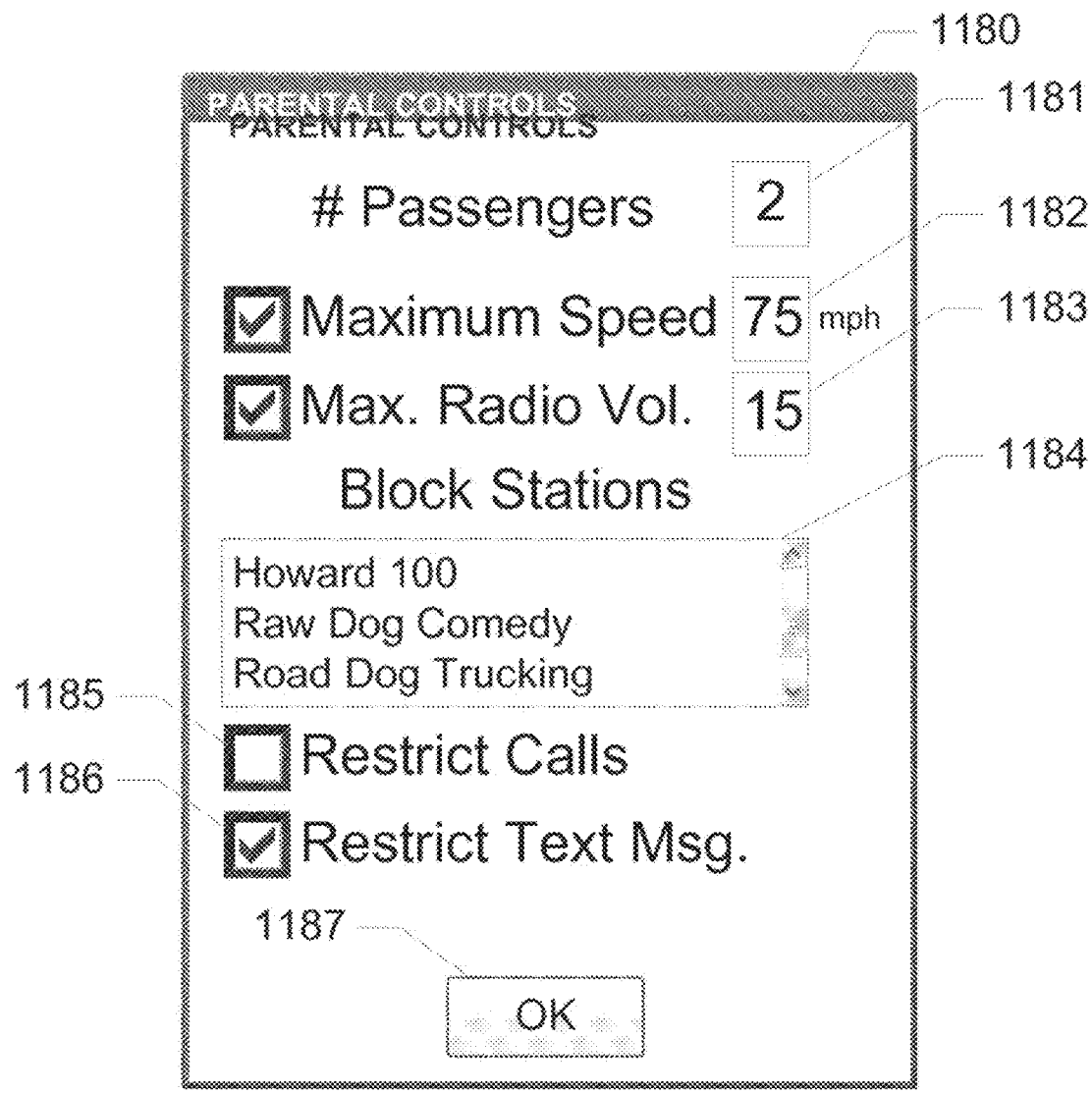
FIG. 11 shows a screenshot of the creation of settings for a driver, according to an exemplary embodiment of the present invention.

FIG. 11 shows a screenshot of the creation of settings for a driver, according to an exemplary embodiment of the present invention. The settings may be created on a wireless communications device in communication with a network, on a personal computer in communication with the network through a web portal, on a screen in a vehicle, etc. In this embodiment, the settings are in the form of parental controls 1180. Parental controls 1180 includes a number of passengers entry 1181, a maximum speed entry 1182, a maximum radio volume entry 1183, a station block selection 1184, a call restriction option 1185, and a text message restriction option 1186. A parent or other controlling authority may use parental controls 1180 in order to control settings of a smart vehicle for certain drivers. Number of passengers entry 1181 allows the parent to choose a number of passengers to create settings for. In this instance, the parent is creating settings that will occur when the specified driver has two passengers. The parent has checked the box of maximum speed entry 1182 and entered a maximum speed of seventy-five miles per hour for the driver. Thus, when the settings are in place and two passengers are present, if the driver attempts to exceed seventy-five miles per hour, a speed governor on the smart vehicle restricts these attempts. The parent has checked the box of maximum radio volume 1183 and has entered a maximum volume of fifteen. This maximum volume may be decibels, a volume unit on the radio, etc. With this setting in place, the driver is not able to play the radio at a volume in excess of the set limit when two passengers are present. The parent has the option of blocking certain radio stations with station block selection 1184. Station block selection 1184 may present the parent with local radio stations available in the area, satellite radio stations, etc. The parent may select stations from a list, enter stations manually, etc. With these settings in place when two passengers are present, the smart vehicle will not allow the radio to be changed to these stations. Call restriction option 1185 prevents the driver from receiving calls on the driver's wireless communication device while driving. Text message restriction option 1186 prevents the driver from creating text messages on the driver's wireless communication device while driving. As previously stated, call restriction option 1185 and text message option 1186 may be executed via a "crippling" application installed on the driver's wireless communication device, by editing registry entries of an operating system of the driver's wireless communication device, by limiting services offered by the network during the course of driving the smart vehicle (such as disabling text messages), or by any equivalent means known in the art.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A settings control system comprising:
a processor; and
a memory storing instructions that, when executed by the processor, cause the processor to perform operations comprising
receiving a unique identifier associated with a first wireless communication device of a first user and a unique identifier associated with a second wireless communication device of a second user,
determining that the first user is a driver of a vehicle based, at least in part, on a difference between a signal received from the first wireless communication device of the first user and a signal received from the second wireless communication device of the second user,
transmitting, to a server via a network, the unique identifier associated with the first wireless communication device of the first user determined to be the driver of the vehicle,
receiving, from the server via the network, in response to transmitting the unique identifier associated with the first wireless communication device of the first user determined to be the driver of the vehicle to the server, a setting corresponding to the unique identifier associated with the first wireless communication device of the first user determined to be the driver of the vehicle, wherein the setting is for controlling a function of the vehicle when the first user is determined to be the driver of the vehicle, and
implementing the setting, wherein implementation of the setting controls the function of the vehicle.

2. The settings control system of claim 1, further comprising an antenna located proximate to a driver seat of the vehicle, wherein the difference between the signal received from the first wireless communication device of the first user and the signal received from the second wireless communication device of the second user is based, at least in part, on a proximity of the first wireless communication device of the first user to the antenna located proximate to the driver seat.

3. The settings control system of claim 2, further comprising a secondary sensor, wherein the operations further comprise verifying that the first user is the driver based on output received from the secondary sensor of the vehicle.

4. The settings control system of claim 1, wherein the setting comprises a radio control and wherein implementation of the setting causes at least one of a maximum radio volume of a radio of the vehicle to be set, allowed radio stations to be set, or compact discs prohibited from being played by the radio of the vehicle to be set.

5. The settings control system of claim 1, wherein the setting comprises a permitted speed setting and wherein implementation of the setting causes a maximum allowed speed of the vehicle to be set.

6. The settings control system of claim 1, wherein the setting comprises a wireless communication device control and wherein implementation of the setting causes prohibition of acceptance of communications received via the first wireless communication device.

7. The settings control system of claim 1, wherein the setting is dependent on a number of passengers in the vehicle.

8. The settings control system of claim 1, wherein the first wireless communication device is a contactless smart card.

9. A method comprising:
receiving, at a settings control system comprising a processor, a unique identifier associated with a first wireless communication device of a first user and a unique identifier associated with a second wireless communication device of a second user;
determining, by the settings control system, that the first user is a driver of a vehicle based, at least in part, on a difference between a signal received from the first wireless communication device of the first user and a signal received from the second wireless communication device of the second user;
transmitting, by the settings control system to a server via a network, the unique identifier associated with the first wireless communication device of the first user determined to be the driver of the vehicle;
receiving, at the settings control system, from the server via the network, in response to transmitting the unique identifier associated with the first wireless communication device of the first user determined to be the driver of the vehicle to the server, a setting corresponding to the unique identifier associated with the first wireless communication device of the first user determined to be the driver of the vehicle, wherein the setting is for controlling a function of the vehicle when the first user is determined to be the driver of the vehicle; and
implementing, by the settings control system, the setting, wherein implementation of the setting controls the function of the vehicle.

10. The method of claim 9, wherein the difference between the signal received from the first wireless communication device of the first user and the signal received from the second wireless communication device of the second user is based, at least in part, on a proximity of the first wireless communication device of the first user to an antenna located proximate to a driver seat of the vehicle.

11. The method of claim 10, further comprising verifying that the first user is the driver based on output received from a secondary sensor of the vehicle.

12. The method of claim 9, wherein the setting comprises a radio control and wherein implementation of the setting causes at least one of a maximum radio volume of a radio of the vehicle to be set, allowed radio stations to be set, or compact discs prohibited from being played by the radio of the vehicle to be set.

13. The method of claim 9, wherein the setting comprises a permitted speed setting and wherein implementation of the setting causes a maximum allowed speed of the vehicle to be set.

14. The method of claim 9, wherein the setting comprises a wireless communication device control and wherein implementation of the setting causes prohibition of acceptance of communications received via the first wireless communication device.

15. The method of claim 9, wherein the setting is dependent on a number of passengers in the vehicle.

16. The method of claim 9, wherein the first wireless communication device is a contactless smart card.

17. A computer-readable memory storing instructions that, when executed by a processor of a settings control system, cause the processor to perform operations comprising:
receiving a unique identifier associated with a first wireless communication device of a first user and a unique identifier associated with a second wireless communication device of a second user;

determining that the first user is a driver of a vehicle based, at least in part, on a difference between a signal received from the first wireless communication device of the first user and a signal received from the second wireless communication device of the second user;

transmitting, to a server via a network, the unique identifier associated with the first wireless communication device of the first user determined to be the driver of the vehicle;

receiving, from the server via the network, in response to transmitting the unique identifier associated with the first wireless communication device of the first user determined to be the driver of the vehicle to the server, a setting corresponding to the unique identifier associated with the first wireless communication device of the first user, wherein the setting is for controlling a function of the vehicle when the first user is determined to be the driver of the vehicle; and implementing the setting, wherein implementation of the setting controls the function of the vehicle.

18. The computer-readable memory of claim 17, wherein the difference between the signal received from the first wireless communication device of the first user and the signal received from the second wireless communication device of the second user is based, at least in part, on a proximity of the first wireless communication device of the first user to an antenna located proximate to a driver seat of the vehicle.

19. The computer-readable memory of claim 18, wherein the operations further comprise verifying that the first user is the driver based on output received from a secondary sensor of the vehicle.

20. The computer-readable memory of claim 17, wherein the setting is dependent on a number of passengers in the vehicle.

* * * * *